R. N. CRANFORD.
AUTOMOBILE DRAFT APPLIANCE.
APPLICATION FILED MAR. 24, 1915.
1,234,294. Patented July 24, 1917.
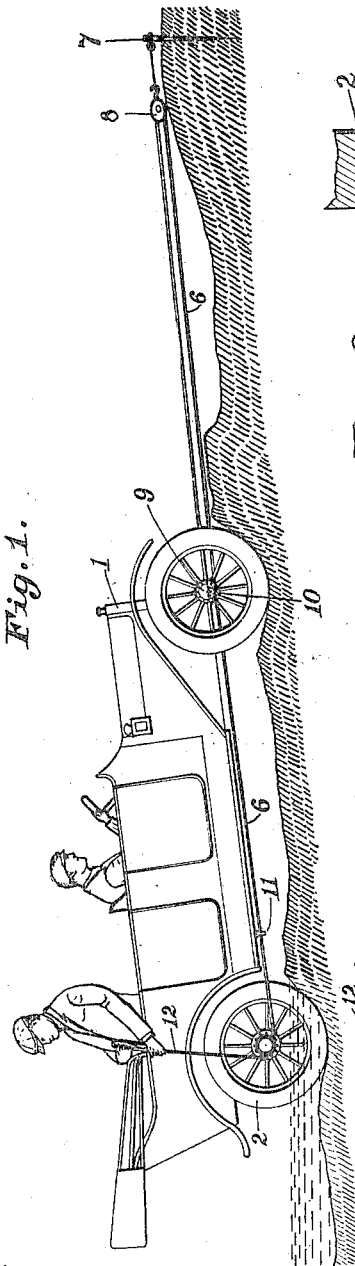
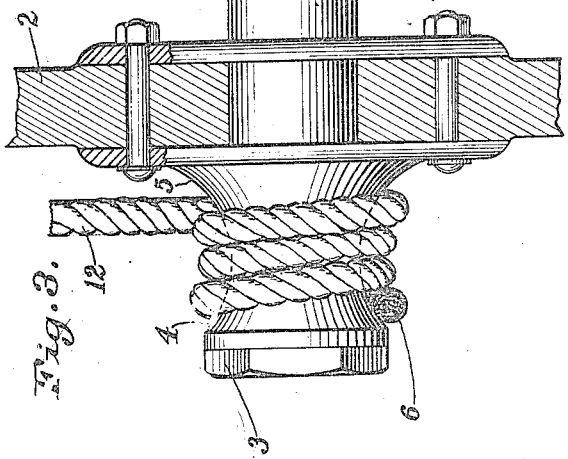
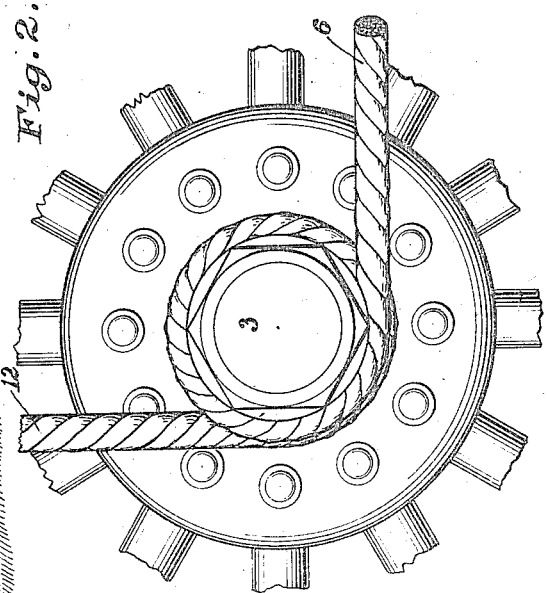
Witnesses:
Joseph D. Connolly Jr.
R. R. Love
Inventor
Ralph N. Cranford,
By his Attorneys
Edwards, Sager & Wooster

UNITED STATES PATENT OFFICE.

RALPH N. CRANFORD, OF NEW YORK, N. Y.

AUTOMOBILE DRAFT APPLIANCE.

1,234,294.  Specification of Letters Patent.  Patented July 24, 1917.

Application filed March 24, 1915. Serial No. 16,596.

*To all whom it may concern:*

Be it known that I, RALPH N. CRANFORD, a citizen of the United States, residing at New York, in the county of New York and State of New York, have invented certain new and useful Improvements in Automobile Draft Appliances, of which the following is a full, clear, and exact specification.

This invention relates to automobiles and has particular reference to an improved means for starting an automobile when stalled in mud, snow, or other situations where the normal adhesion between the tire and the ground is insufficient to move the car.

A number of appliances for this general purpose have heretofore been devised, wherein generally, there is a rope attached to a distant stake or other fixed point, and thence leading around the hub of the wheel and attached to the wheel, so that when the wheel is driven by the motor, the rope is wound up on the hub and thereby the necessary tractive effort applied to the automobile to free it of the obstruction. In some instances these winding hubs are in the form of attachments which are carried in the car and fastened to the wheel when necessary to extricate the car. In all the prior devices with which I am familiar, one end of the rope has been attached to the driven wheel, and the operator starts the motor, connects it with the wheel and the sudden winding up of the rope on the hub is expected to move the car. These prior devices are objectionable not only because they frequently require the carrying of extra parts, but also because they do not enable the tractive effort to be applied gradually to the stalled car, nor do they enable the tractive effort to be controlled after once applied. This is because the rope simply winds up on the drum and the effective drum diameter tends to continually increase and thus increase the pull of the rope. It is especially difficult to operate such devices with internal combustion motors, because such motors stall very easily if the load is suddenly applied, and it also involves an excessive strain on the motor, clutch, transmission, differential and tires, to let in the clutch and then wind up the draft rope on the hub. The rope must be very strong and even then, there is considerable chance of either breaking the rope or burning the clutch, or stripping some of the gears, and especially after the automobile has once begun to move, and the rope winds up very rapidly on the drum. If the car must be drawn a considerable distance before reaching dry ground, a drum of objectionably large size will be required, and also an excessively long rope, and under the most favorable circumstances, it is not possible to operate such devices without shocks, jars and strains to the various parts.

According to the present invention, the foregoing objections are overcome, and a simple and effective draft appliance is provided which only requires a wheel hub of peculiar shape and winding of the rope in a novel manner. With this invention, it is possible not only to gradually apply the tractive effort to the automobile, but this effort can be manually controlled simply by varying the tension on the rope, and at any point the tension can be relaxed and the movement stopped, or slowed up, as is desirable in case of a boulder or log which should be surmounted slowly. My invention comprises what I call a gypsy hub, which has the distinctive shape which outlined in plan would be that of a double concave surface. In other words, it would be substantially the form of two cones merging at the apex, one end of the rope being connected to the fixed distant point according to common custom, the intermediate portion of the rope being coiled around the gypsy hub and the free end of the rope being controlled either by a passenger in the car, or by a person on the ground. Owing to the double conical form of the hub the coils tend to bind simultaneously upon each other and the hub when the rope is stretched, and the friction between the hub and the rope can be very minutely varied according to the tension applied to the free end of the rope. When the slack between the hub and the fixed point has been taken up, for example, and the car moved a slight distance, it can be held in that position by very slight tension on the rope and yet the rope can be relaxed sufficiently so that the hub will slip inside the coils in case the engine should stall and it is necessary to again start the operation. A further advantage of the invention is that no appliances, other than the rope, need be carried, as the hub can be made by the manufacturer of the proper shape and strength, requiring no material increase in size over the average hub. It can also be of ornamental appearance at the same time. The invention is shown in the accompanying drawing, wherein—

Figure 1 is an elevation showing the invention in operation;

Fig. 2 is a detailed side elevation of the coiling of the rope on the hub, and

Fig. 3 is an elevation of the hub looking toward the rear.

1 represents the automobile having a rear wheel 2, provided with the gypsy hub 3, which consists of opposite coned or circular surfaces 4, 5, constituting a gypsy. 6 represents the fixed end of the rope, which may be directly attached to a stake or other fixed point 7, but as shown herein leads around a block 8 attached to the stake 7, and is then attached to the front axle 9 of the car. The front axle of the car is also provided with a guide 10 through which the rope leads and a similar guide 11 is under the running board, so that the rope 6 leads to the gypsy hub 3 clear of the wheel tire. The rope is coiled around the gypsy hub as shown in Fig. 3, three coils ordinarily being sufficient and thence the free end 12 of the rope leads upwardly so as to be controlled by the passenger as shown in Fig. 1. Of course, instead of leading the rope upwardly to the passenger, it could be equally well controlled if he stood on the ground outside the car. It is preferable to have the rope controlled by some one on the car, as he can then be told by the driver or can tell for himself just how to pull on the rope.

In operation, the rope being fixed at one end as shown and the other end being free and manually controlled, the motor of the car is started by the driver and connected to the wheel, which carries the gypsy hub. As the wheel begins to turn, owing to the slip, the portion 12 of the rope is stretched which causes its coils to closely bind on each other and at the same time, owing to the conical hub surface closely bind on the hub. Thus the tractive force is applied through the rope to the car and it necessarily moves. Many cars have differentially driven wheels, and in actual experience, it is found that in many instances, the car can be moved without blocking the differential, because as soon as one wheel begins to roll, the other wheel will also roll and in many instances take hold and help drive the car. If not, it is a simple matter to use this invention by blocking the other wheel, or by winding a rope on the gypsy hubs of both wheels. After the car has commenced to move, there may be obstructions such as boulders or logs to be overcome, and this can be accomplished without liability of breaking springs by relaxing the tension on the rope 12 so that there will be some slip between the gypsy hub and the rope. In other words, by this invention, it is possible not only to apply the power gently, which prevents stalling the motor, straining the gears, or breaking the rope, but the power can also be controlled at any point of the movement by the tension of the rope, which is not possible with prior devices.

By this invention, it will be seen that there is provided in addition to means for moving a stalled automobile by its own power, manually controlled means for varying the tractive effort, independently of the speed of the motor, instead of as in prior devices only being able to vary the tractive effort by changing the motor speed. It will also be seen that as the wheels begin to drive naturally, it is only necessary to pull in the free end of the rope faster in order to keep the rope tight and prevent it from becoming entangled in the wheels. In prior devices when the wheels began to drive naturally the rope slackens up and is liable to become entangled up in the wheels and the running gear of the automobile.

Having thus described my invention, what I declare as new and desire to secure by Letters Patent of the United States is:—

1. In combination, an automobile having one of its rear wheel hubs formed integrally as a gypsy winding drum, a guide eyelet fixed under the running board in front of said hub, another guide eyelet fixed under the front axle, a pulley attached to a fixed object in front of the automobile, and a cable wound on said drum but not otherwise fastened thereto, one end part of said cable extending from the drum over the side and into the body of the automobile where it can be manipulated by a man in said body, and the other end part extending from said drum through said eyelets in the order mentioned and around the pulley with its extremity fastened to the front axle.

2. In combination, an automobile having an integral outer hub, said hub having a double conoidal form with one base in the plane of the wheel and the other base parallel thereto and forming the outer face of the hub and with the intermediate portion bounded by a surface of revolution for which each element made by an axial section is a smooth curve concave outwardly from the axis, and a cable wound on said drum but not otherwise fastened thereto, one end part of said cable extending from the drum to a point where it can be conveniently manipulated and the other part extending from said drum forward to a fixed point outside the automobile.

3. In combination, an automobile having one of its rear wheel hubs formed integrally as a gypsy winding drum, a cable wound on said drum but not otherwise fastened thereto, and a guide for said cable on a part of the automobile forward of said rear wheel, one end part of said cable extending through said guide and engaging a fixed support in front of the automobile and the other end part of said cable extending to a point where it can be conveniently manipulated.

In testimony whereof I affix my signature, in presence of two witnesses.

RALPH N. CRANFORD.

Witnesses:
K. G. Le Ard,
Arthur Alten, Jr.